United States Patent
Bishop et al.

(10) Patent No.: US 10,439,735 B2
(45) Date of Patent: Oct. 8, 2019

(54) QUANTUM COMMUNICATION LINK ROBUST AGAINST PHOTON LOSS

(71) Applicant: INTERNATIONAL BUSINESS MACHINES CORPORATION, Armonk, NY (US)

(72) Inventors: Lev S. Bishop, Yorktown Heights, NY (US); Jay M. Gambetta, Yorktown Heights, NY (US); Hanhee Paik, Danbury, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 8 days.

(21) Appl. No.: 15/451,805

(22) Filed: Mar. 7, 2017

(65) Prior Publication Data

US 2018/0262276 A1  Sep. 13, 2018

(51) Int. Cl.
  *H04B 10/70* (2013.01)
  *G06N 10/00* (2019.01)

(52) U.S. Cl.
  CPC .......... *H04B 10/70* (2013.01); *G06N 10/00* (2019.01)

(58) Field of Classification Search
  CPC ...... H04B 10/70; H04B 10/00; H04B 10/077; H04B 10/07955; G06N 99/002; G06N 10/00; H04J 14/0227; H04J 3/0682
  See application file for complete search history.

(56) References Cited

U.S. PATENT DOCUMENTS

| | | | |
|---|---|---|---|
| 7,133,173 B2 | 11/2006 | Beausoleil, Jr. et al. | |
| 7,518,120 B2 | 4/2009 | Monroe et al. | |
| 7,889,992 B1* | 2/2011 | DiVincenzo | G06N 10/00 |
| | | | 398/115 |
| 8,817,254 B2 | 8/2014 | Santori et al. | |
| 8,913,900 B2 | 12/2014 | Lukin et al. | |
| 9,270,385 B2 | 2/2016 | Meyers et al. | |
| 9,294,191 B2 | 3/2016 | Peters et al. | |
| 9,350,460 B2 | 5/2016 | Paik | |
| 2003/0086138 A1* | 5/2003 | Pittman | B82Y 10/00 |
| | | | 359/108 |
| 2004/0252732 A1 | 12/2004 | Ralph | |

(Continued)

FOREIGN PATENT DOCUMENTS

| CN | 1639660 A | 7/2005 |
|---|---|---|
| CN | 101164076 A | 4/2008 |

OTHER PUBLICATIONS

PCT/IB2017/057630 International Search Report and Written Opinion, dated Feb. 12, 2018.

(Continued)

*Primary Examiner* — Ted M Wang
(74) *Attorney, Agent, or Firm* — Cantor Colburn LLP; Vazken Alexanian

(57) ABSTRACT

A technique relates to communication of a quantum state. Polarization hardware is configured to receive a polarization encoded qubit and split the polarization encoded qubit into two qubits. A converter is coupled to the polarization hardware, and the converter is configured to convert the two qubits into a form suitable for a CNOT gate. The CNOT gate is configured to receive the two qubits such that a measurement result of a CNOT operation of the CNOT gate determines success of the communication of the quantum state.

11 Claims, 8 Drawing Sheets

(56) References Cited

U.S. PATENT DOCUMENTS

2007/0162262 A1* 7/2007 Tucci ............ G06N 10/00
703/1
2014/0292367 A1 10/2014 Liao et al.
2014/0314419 A1 10/2014 Paik

OTHER PUBLICATIONS

Hong-Fu Wang et al., "Deterministic CNOT gate and entanglement swapping for photonic qubits using a quantum-dot spin in a double-sided optical microcavity", Physics Letters A 377.40, arXiv:1309.0410v1 [quant-ph] Sep. 2, 2013, pp. 1-18.
Joerg Bochmann et al., "Nanomechanical coupling between microwave and optical photons", Nature Physics, DOI: 10.1038/NPHYS2748, Sep. 2013, pp. 1-5.
Mankei Tsang, "Cavity Quantum Electo-Optics. II. Input-Output Relations between Traveling Optical and Microwave Fields", Phys. Rev. A 84, 043845, Published Oct. 27, 2011, pp. 1-8.
R.W. Andrews et al., "Bidirectional and efficient conversion between microwave and optical light", Nat. Phys. 10, 312, 2014, pp. 1-17.
T. Bagci et al., "Optical detection of radio waves through ananomechanical transducer", Nature 507 81, 2014, pp. 1-14.

\* cited by examiner

US 10,439,735 B2

QUANTUM COMMUNICATION LINK ROBUST AGAINST PHOTON LOSS

BACKGROUND

The present invention relates generally to quantum devices, and more specifically, to a quantum communication link that is robust against photon loss.

The fundamental element of a quantum computer is the quantum bit which is known as the "qubit." As opposed to a classical bit representing zero and one, a qubit is also able to represent a quantum superposition of the two states. The states can be formalized within the laws of quantum physics as a probability of being in the two states. Accordingly, the states can be manipulated and observed within the laws of quantum physics.

Quantum properties include quantum entanglement and quantum teleportation of information, which is linked to the property of quantum entanglement. Quantum entanglement can exist between any two quantum systems such as between two photons, two atomic/ionic systems, or between a photon and an atom/ion based quantum system. Quantum communications can sometimes be used in conjunction with compression techniques involving the usage of qubits. Qubits are units of quantum information that can be visualized by a state vector in a two-level quantum-mechanical system. Unlike a binary classical bit, a qubit can have the values of zero or one, or a superposition of both. A qubit may be measured in basis states (or vectors), and a conventional Dirac symbol is used to represent the quantum state values of zero and one, such as for example $|0\rangle$ and $|1\rangle$. For example, on a physical qubit this can be implemented by assigning the value "0" to a horizontal photon polarization and the value "1" to the vertical photon polarization. The "pure" qubit state is a linear superposition of those two states which can be represented as a combination of $a|0\rangle + b|1\rangle$. However, transmitting quantum information/state (via a flying qubit, i.e., transmitting qubit) across a lossy channel such as, an optical fiber link, can yield a very low efficiently due to loss, and consequently one cannot access the information of the received quantum information/qubit state.

In computing science, the controlled NOT gate (also C-NOT or CNOT) is a quantum gate that is an essential component in the construction of a quantum computer. The CNOT gate can be used to entangle and disentangle EPR states. Any quantum circuit can be simulated to an arbitrary degree of accuracy using a combination of CNOT gates and single qubit rotations. Moreover, the CNOT gate is the quantization of a classical gate.

SUMMARY

According to embodiments of the present invention, a system for a communication of a quantum state is provided. The system includes polarization hardware configured to receive a polarization encoded qubit and split the polarization encoded qubit into two qubits, and a converter coupled to the polarization hardware. The converter is configured to convert the two qubits into a form suitable for a CNOT gate. The CNOT gate is configured to receive the two qubits such that a measurement result of a CNOT operation of the CNOT gate determines success of the communication of the quantum state.

According to embodiments of the present invention, a method for a communication of a quantum state is provided. The method including providing polarization hardware configured to receive a polarization encoded qubit and split the polarization encoded qubit into two qubits, and providing a converter coupled to the polarization hardware. The converter is configured to convert the two qubits into a form suitable for a CNOT gate, and the CNOT gate is configured to receive the two qubits. Also, the method includes determining success of the communication of the quantum state based on a measurement result of the target qubit from a CNOT operation of the CNOT gate.

According to embodiments of the present invention, a system for communication is provided. The system includes a CNOT gate configured to receive two qubits. The CNOT gate is configured to entangle the two qubits. The system includes a converter coupled to the CNOT gate, and the converter is configured to convert the two qubits into a form suitable for a polarization hardware. The polarization hardware is configured to receive the two qubits and combine the two qubits into a polarization encoded qubit for communication.

According to embodiments of the present invention, a communication method includes receiving two qubits, entangling, using a CNOT gate, the two qubits, and converting, using a converter coupled to the CNOT gate, the two qubits into a form suitable for a polarization hardware. Also, the method includes combining, using the polarization hardware, the two qubits into a polarization encoded qubit for communication.

According to embodiments of the present invention, a confirming communication method is provided. The method includes receiving, using polarization hardware, a qubit over a polarization preserved optical fiber, and confirming, using a CNOT gate, receipt of the qubit based on a measurement from a CNOT operation.

DETAILED DESCRIPTION

Figure 1:
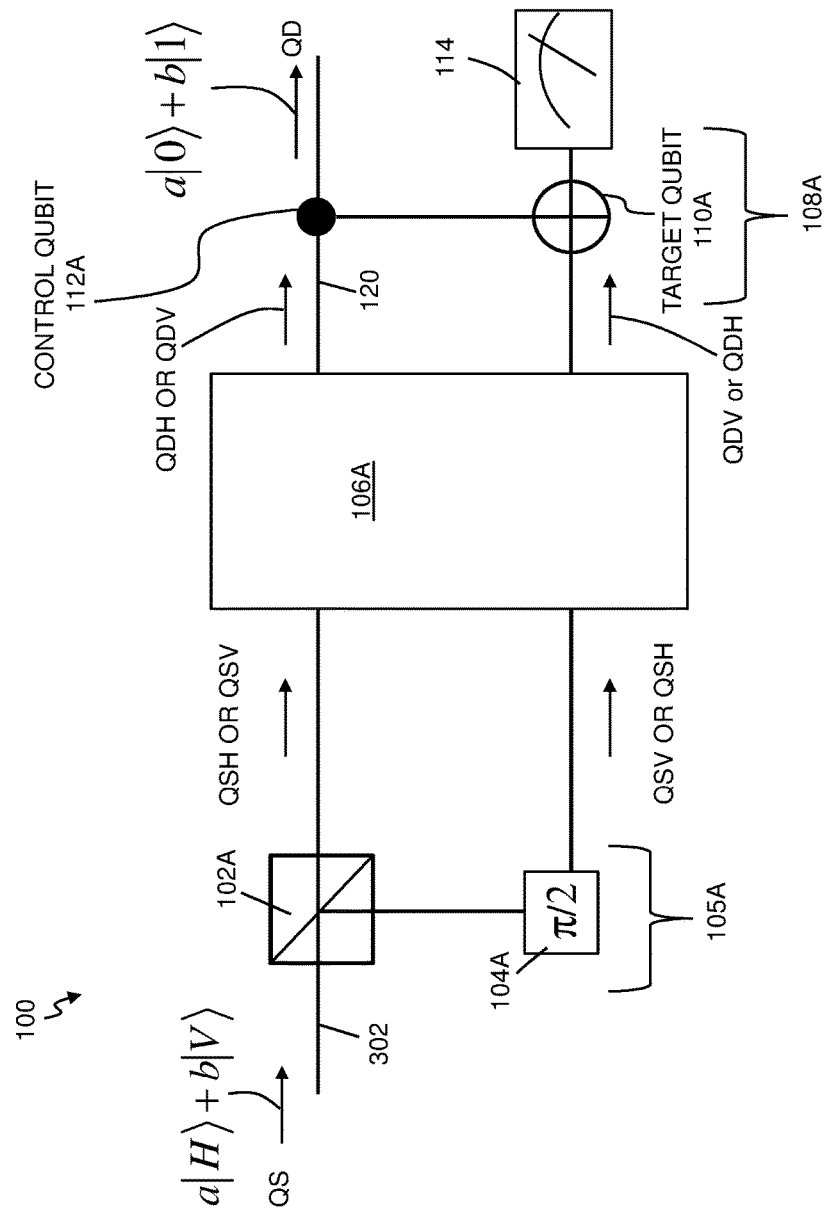
FIG. 1 is a schematic of a receiver system according to embodiments of the invention.

Various embodiments are described herein with reference to the related drawings. Alternative embodiments can be devised without departing from the scope of this document. It is noted that various connections and positional relationships (e.g., over, below, adjacent, etc.) are set forth between elements in the following description and in the drawings. These connections and/or positional relationships, unless specified otherwise, can be direct or indirect, and are not intended to be limiting in this respect. Accordingly, a coupling of entities can refer to either a direct or an indirect coupling, and a positional relationship between entities can be a direct or indirect positional relationship. As an example of an indirect positional relationship, references to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

Embodiments of the present invention include a system and method to transmit a quantum state successfully across a lossy optical link by using a polarization encoding and taking advantage of the ability to perform quantum operations on the qubits for post-selection. The system and the method allow heralding of the successful transmission of the quantum state which enables a repeat-until-success protocol. This is particularly useful for blind quantum computation, where the client (e.g., sender) needs to only be able to prepare single-photon states (i.e., quantum states) along a small set of polarization directions, and the server (e.g., receiver) will perform the difficult quantum processing after receiving the single-photon states.

Transmitting quantum information (via a flying qubit) across a lossy channel such as, an optical fiber link, can yield a very low efficiently because of loss. As a result of the loss, one cannot access the received quantum information/qubit state. Embodiments are configured to exploit a controlled NOT (CNOT) operation and quantum detection on a microwave qubit converted from a polarization encoded qubit, which heralds receipt of the qubit. As noted above, embodiments are particularly useful in cases where repeat-until-success is a viable. For example, an important case is for blind quantum computing, where the client (e.g., sender) needs to send encoded qubits to the server (e.g., receiver) one-at-a-time and where each attempt (of sending) can generate a fresh encoding. It is noted that the terms client for sender and server for receiver are utilized for explanation purposes and not limitation. In some embodiments, the client can create or generate the qubit that is to be sent while the server can perform the quantum computations. Also, the terms sender and receiver are utilized for ease of understanding and not limitation. However, the transmission of the qubit is bidirectional such that the sender can both transmit and receive qubits over the optical communication fiber. Likewise, the receiver can both transmit and receive qubits over the optical communication fiber. Therefore, it should be appreciated that the identification of the sender and receiver can change according to the direction of the transmission.

Figure 2:
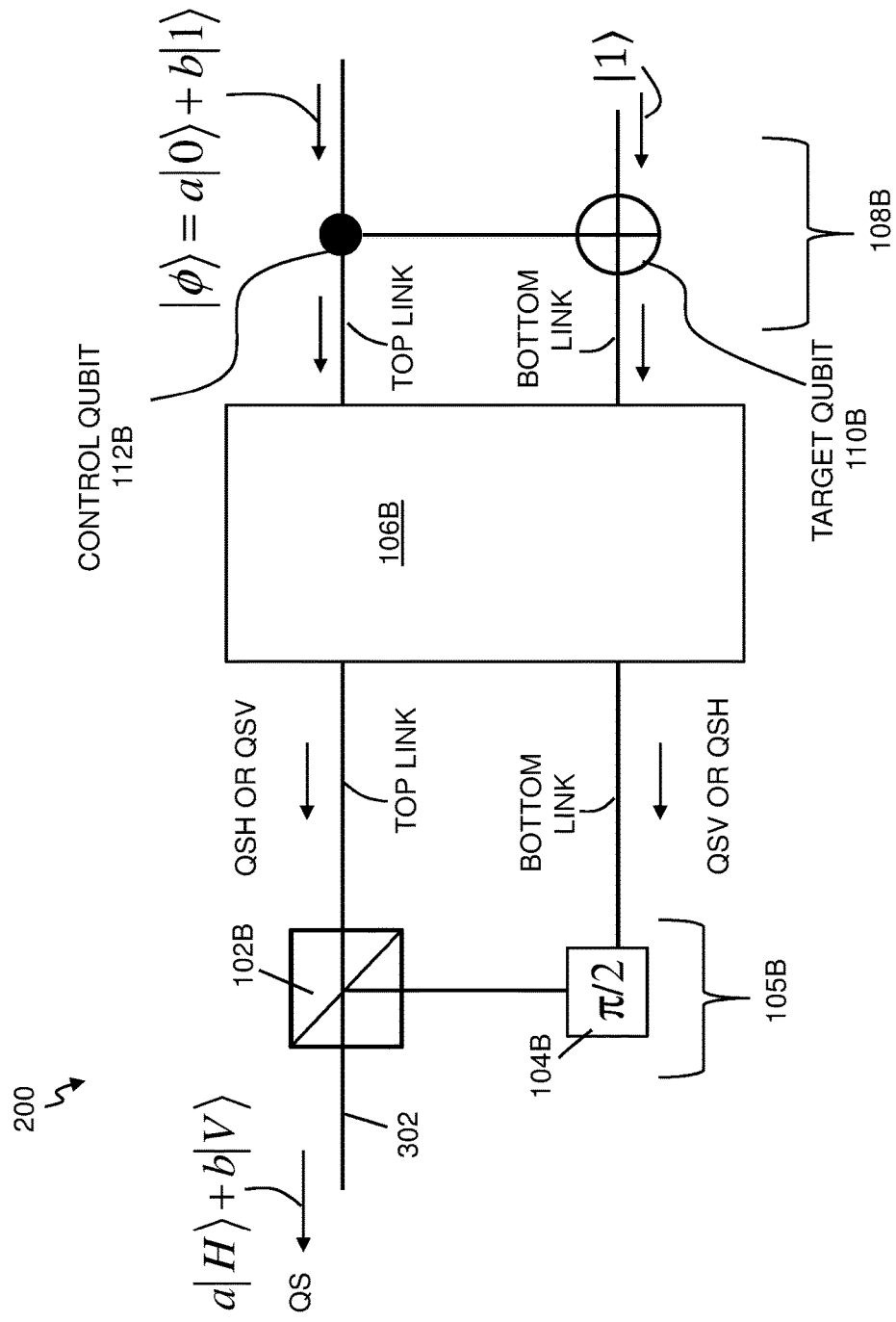
FIG. 2 is a schematic of a transmitter system according to embodiments of the invention.
Figure 3:
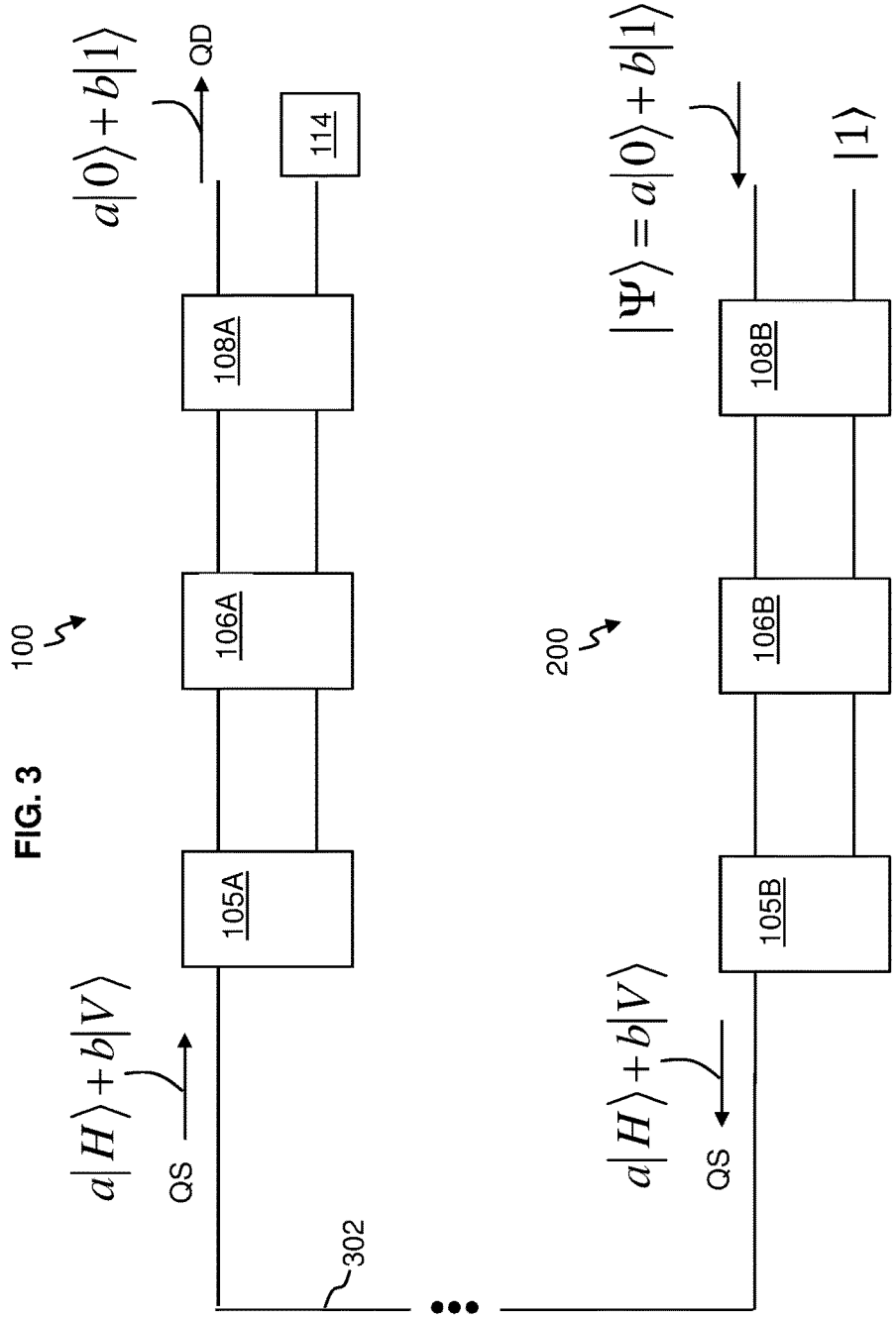
FIG. 3 is a general view of the receiver system in FIG. 1 combined with the transmitter system in FIG. 2 according to embodiments of the invention.

FIG. 1 is a schematic of a receiver system 100 (receiver or server) according to embodiments. FIG. 2 is a schematic of a transmitter system 200 (sender or client) according to embodiments. However, the operation of the receiver system 100 does not require the transmitter system 200, and the sender can use a simple polarization encoding setup to send a polarization encoded qubit state to the receiver system 100. The transmitter system 200 is a reverse of the receiver system 100, and this shows that the receiver system 100 can work reciprocally. The transmitter system 200 is used when the sender prepared the qubit state in the microwave domain. As noted above, the terms receiver and transmitter can be interchanged because transmission of the qubit is bidirectional, and FIGS. 1, 2, and 3 are simply depicting a single communication direction. Additionally, the same hardware can be utilized in both the receiver system 100 and transmitter system 200 but the respective hardware functions from opposite perspectives. The receiver system 100 includes polarization hardware 105A, a converter 106A, and a CNOT gate 108A. Similarly, the transmitter system 200 includes polarization hardware 105B, a converter 106B, and a CNOT gate 108B.

Turning to FIG. 1, the receiver system 100 is configured to receive over an optical communication link 302 a polarization encoded source qubit (QS). The optical communication like 302 can be a fiber optic link. The optical communication link 302 is a polarization preserving optical link. The incoming polarization encoded qubit (QS) can be sent from a simple polarization encoder or from the transmitter system 200 (in FIG. 2), and the origin of the input qubit does not affect the function of the receiver system 100.

The source qubit is $a|H\rangle + b|V\rangle$, which is a polarization encoded photonic qubit, and $a|H\rangle + b|V\rangle$ is a superposition of states between $|H\rangle$ and $|V\rangle$, where "a" is a horizontal quadrature component and "b" is a vertical quadrature component and where $|a|^2 + |b|^2 = 1$. Photonic waveguides carry the polarization encoded optical flying qubit (i.e., source qubit) to a polarization beam splitter 102A. Upon receiving the source qubit, the polarization beam splitter 102A is configured to split the input polarization encoded source qubit into a pair of source qubits. This pair of source qubits is a horizontal source qubit (QSH) and a vertical source qubit (QSV) which are split from the polarization encoded source qubit by the polarization beam splitter 102A. As an example, a Wollaston prism is a polarizing beam splitter, and the Wollaston prism uses birefringent materials to split light into beams of differing polarization. The horizontal source qubit is horizontally polarized, while the vertical source qubit is vertically polarized. The polarization beam splitter 102A functions as a beam splitter in one direction but also functions as a beam combiner in the opposite direction as depicted in transmitter system 200 in FIG. 2. Polarization can be utilized because the information is more robust against a photon loss which (always) happens in any part of transmission of light. It is noted that embodiments can also use more than one photon to form a polarization encoded-qubit. One skilled in the art understands that polarization encoding is a well-known technique in photonic quantum computing.

After splitting the polarization encoded source qubit into the pair of source qubits, one of the qubits is transmitted from the polarization beam splitter 102A to the converter 106A while the other qubit is transmitted to a polarization shifter 104A or vice versa. For explanation purposes, it is assumed that the horizontal source qubit is transmitted to the converter 106A and the vertical source qubit is transmitted to the polarization shifter 104A. The polarization shifter 104A can be a 90° (degree) polarization shifter. Accordingly, the polarization shifter 104A shifts the vertical source qubit 90°, and the shifted vertical source qubit is transmitted to the converter 106A.

The converter 106A is a transducer that converts the pair of qubits (which are the horizontal source qubit and vertical source qubit) from one form of energy to another form of energy. In some embodiments, the converter 106A (106B) functions as an optical-to-microwave converter in one direction and a microwave-to-optical converter in the opposite direction. The converter 106A is configured to convert the pair of qubits into a form in which a CNOT operation can be performed on the pair of qubits. The converter 106A converts the horizontal source qubit and vertical source qubit to a horizontal destination qubit (QDH) and a vertical destination qubit (QDV) respectively. In this example, the horizontal source qubit and vertical source qubit were optical qubits (in the optical domain) prior to conversion. After conversion by the converter 106A (e.g., optical-to-microwave converter), the horizontal destination qubit and vertical destination qubit are microwave qubits in the microwave domain. The frequency of the optical domain can be anywhere from infrared to ultra-violet (about 300 gigahertz (GHz) to 30 petahertz (PHz), but a typical frequency will be around 193 terahertrz (THz)), while the microwave domain can be about 10 megahertz (MHz) to 300 GHz. The (microwave) pair of qubits (horizontal destination qubit and vertical destination qubit) are transmitted over (two) microwave communication links 120 to the CNOT gate 108A, after exiting the converter 106A. After conversion, the information is encoded in (microwave) photon numbers, but for explanation, we label the qubits as a horizontal destination qubit and a vertical destination qubit. The microwave communication links 120 can be microwave waveguides that carry stationary microwave photons. In some embodiments, the converter 106B (microwave part of the converter 106B), the microwave communication link 120, and the CNOT gate 108B can include superconducting material and can be cooled to cryogenic temperatures in, for example, a dilution fridge.

After applying some trivial single-qubit gate rotations, the CNOT gate 108A is operated on the horizontal destination qubit and vertical destination qubit from the converter 106A. The single-qubit gate rotation can be a phase shift rotation to account for any phase shift. The CNOT gate 108A performs a NOT operation (flip the qubit state by angle 7C, from 0 to 1 or 1 to 0) on a target qubit 110A if the state of a control qubit 112A is 1. Continuing with the previous example, it can be assumed that the horizontal destination qubit becomes the control qubit 112A and the vertical destination qubit becomes the target qubit 110A for the CNOT 108A. A measurement device 114 measures the output of the target qubit 110A. The measurement device 114 can be a microwave measurement device. The measurement device 114 is configured to measure a "0" which corresponds to, e.g., a predefined low voltage/signal and a "1" which corresponds to, e.g., a predefined high voltage/signal.

The measurement output of the target qubit 110A heralds the successful receipt of the source qubit state at the receiver 100. In some embodiments, the receiver 100 can be arranged that, when the measurement of the target qubit 110A from the CNOT gate 108A outputs a 0 (as measured by the measurement device 114), this measurement result heralds the successful receipt of the source qubit at the receiver 100, and accordingly, this means that the destination qubit (QD) (the control qubit 112A) has the same quantum state as the source qubit (QS). The source qubit can be polarization encoded in the form $a|H\rangle + b|V\rangle$, and the destination qubit can be photon-number encoded in the form $a|0\rangle + b|1\rangle$, where $a|0\rangle + b|1\rangle$ is a superposition state between $|0\rangle$ and $|1\rangle$. As understood by one skilled in the art, $|0\rangle$ is the ground state of a qubit while $|1\rangle$ is the excited state of a qubit. It is noted that post-selecting by heralding on the received qubit state using the result of the CNOT gate 108A enables the experimenters to reject the noise signal caused by the photon loss coming into our qubit channel and to select only the same qubit state of the destination qubit (QD) as the sent source qubit (QS). Therefore, the post-selecting removes the effect of photon loss on transmitting the qubit state.

Returning to the example, measuring/recognizing that target qubit 110A outputs a 0 with the condition of the state of the control qubit 112A confirms receipt of the destination qubit (QD) and confirms that destination qubit (QD) is the same as the source qubit (QS). The destination qubit has successfully traveled the optical communication link 302 with the same quantum information as the source qubit. As further information, it is noted that after the source qubit (QS) is split by the beam splitter 102A, the QS becomes a two-qubit entangled state of QSH and QSV rather than a two separated $a|H\rangle$ and $b|V\rangle$, so we do not know which one among QSH and QSV are traveling exactly where (upper wire or lower wire). As such, the beam splitter 102A makes the QS into a two-qubit state. The single-qubit operation and CNOT gate 108A arrange the new two-qubit state such that by measuring the qubit state on the target qubit 110A, QD state is determined, and when the target state is measured as '0', QD is determined to be the same state as QS.

In some embodiments, the receiver 100 can be arranged that, when the target qubit 110A outputs a 1 as measured by the measurement device 114, this means that the destination qubit (QD) is not the same as the source qubit (QS) and the control qubit 112A is a noise. Accordingly, the receiver system 100 can operate under a repeat-until-success protocol by requiring the transmitter (whether one uses the transmitter system 200 or a simple photonic polarization-encoded qubit generator) to continue sending the polarization encoded source qubit over the optical communication link 302 until the source qubit is delivered and successfully transferred to the destination qubit by the receiver system 100. A separate communication link (not shown) between the transmitter and receiver system 100 can be utilized to relay the success of the destination qubit, such that the transmitter knows to stop sending the source qubit.

As one example to generate and send the source qubit, a simple polarization-encoded qubit generator can be used from a photonic system operating in the optical domain, as understood by one skilled in the art. The transmitter system 200 is used when a source qubit is initially encoded in the microwave domain. Using the transmitter system 200, a source qubit which is in the microwave domain can be converted to a qubit in the optical domain and sent to the receiver system 100. The transmitter system 200 is a reverse of the receiver system 100, which shows that the receiver system 100 can be operated reciprocally.

Figure 4:
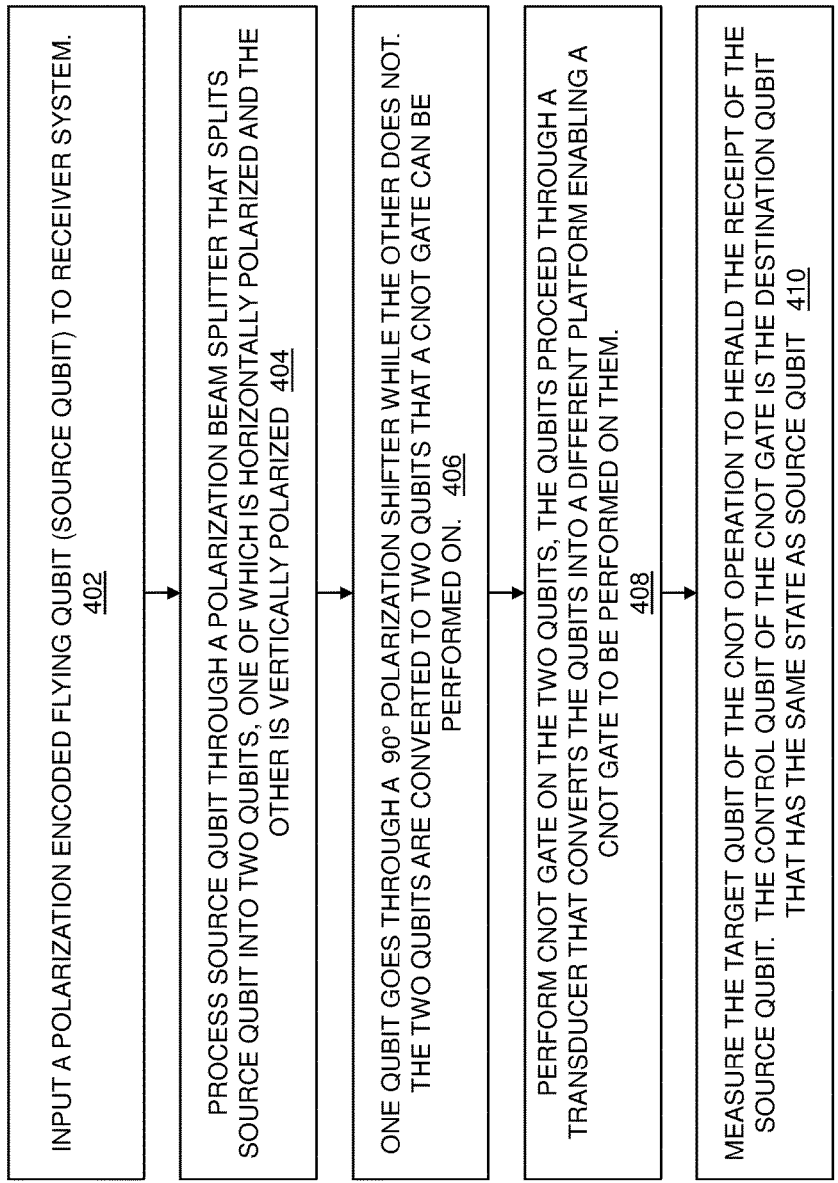
FIG. 4 is a flow chart of a generalized method of how the receiver system operates according to embodiments of the invention.

FIG. 4 is a flow chart of a generalized method of how the receiver system 100 operates according to embodiments. At block 402, a polarization encoded flying qubit (source qubit) is received by the receiver system 100 via the optical communication link 302. At block 404, the qubit source is received by the polarization beam splitter 102A, and the polarization beam splitter 102A splits the polarization encoded source qubit into two qubits, one of which is horizontally polarized (QSH) and the other is vertically polarized (QSV). These two qubits, QSH and QSV, are entangled, and therefore one does not know, by nature, how the qubits are distributed unless a measurement is made.

At block 406, one qubit proceeds through the 90° degree polarization shifter 104A. By nature of the entangled qubits, one does not know which qubit is transmitted through the polarization shifter 104A. However, the shifter 104A will make the polarization of the two entangled qubits same. It should be appreciated that the experimenters cannot choose which qubit (QSH and QSV) proceeds to which transmission line. Once the qubit (QS) goes through the beam splitter 102A, the experimenters have created an entangled two-qubit state and do not know, until the experimenters measure at CNOT gate 108A (via measurement device 114), which qubit is which. This is the nature of entanglement.

At block 408, if the CNOT gate operation cannot be performed on the two qubits, the two qubits are input to the converter 106A that converts the two qubits into a different platform which enables performance of the CNOT gate by the CNOT gate 108A on the two qubits.

At block 410, the CNOT gate operation is performed, and the measurement is performed via measurement device 114 on the target qubit 110A of the CNOT operation to herald the receipt of the source qubit. The control qubit 112A of the CNOT gate is denoted/defined as the destination qubit that has the same state as the source qubit (transmitted from the sender or the transmitter system 200 over communication link 302).

FIG. 2 is a schematic of the transmitter system 200 according to embodiments. FIG. 2 illustrates how to encode a quantum state of a non-polarization encoded qubit to a polarization encoded qubit. FIG. 2 shows the perspective for the sender, and the same hardware in FIG. 1 can be utilized in the transmitter system 200. The transmitter system 200 includes the polarization hardware 105B, the converter 106B, and the CNOT gate 108B which are counterparts to 105A, 106B, and 108B in FIG. 1. It is noted that a counterpart to the measurement device 114 is not shown in the transmitter system 200 but the transmitter system 200 can include a measurement device in the case when the transmitter system 200 is operating as a receiver system.

The transmitter system 200 includes a top input and a bottom input. The top input connects to the control qubit 112B of the CNOT gate 108B. The bottom input connects to the target qubit 110B of the CNOT gate 108B. A general state qubit is input to the control qubit 112B via the top input. The general state qubit can be, for example, in the form of $|\phi\rangle = a|0\rangle + b|1\rangle$. A fixed qubit having a fixed state is input to the target qubit 110B. The fixed qubit can be, for example, 11) which is the excited state.

The CNOT gate 108B performs the CNOT operation as described above. The CNOT operation entangles the top and bottom qubits such that their states are entangled resulting in $a|01\rangle + b|10\rangle$, where the first position represents the top qubit (i.e., the top communication link) and the second position represents the bottom qubit (i.e., the bottom communication link). For example, $|01\rangle$ means that the state of the top qubit on the top link is 0 while the state of the bottom qubit on the bottom link is a 1. Similarly, $|10\rangle$ means that the state of the top qubit on the top link is 1 while the state of the bottom qubit on the bottom link is a 0. Therefore, the top and bottom qubits (or rather the entangled two-qubit state) output from CNOT gate 108B on the top and bottom links respectively are represented by $a|01\rangle + b|10\rangle$. The top and bottom qubits are input into the converter 106B. In this direction, the converter 106B performs the opposite conversion of the converter 106A (which was explained from a different direction above), although the converters 106A and 106B can be identical. After receiving the top and bottom qubits, the converter 106B converts the top and bottom qubits from, for example, the microwave domain to the optical domain.

To be consistent with the designations utilized in FIG. 1, the top qubit is referred to as the horizontal source qubit and the bottom qubit is referred to as the vertical source qubit (or vice versa) after polarization. The bottom qubit is input to the polarization shifter 104B to be shifted by 90° resulting in, for example, the vertical source qubit, and the vertical source qubit is input to the polarization beam combiner 102B. Accordingly, the top qubit is input to the polarization beam combiner 102B, and since the bottom qubit has been shifted to be the vertical source qubit, the top qubit is recognized as the horizontal source qubit.

After receiving the vertical source qubit and the horizontal source qubit, the polarization beam combiner 102B is configured to combine both the vertical and horizontal source qubits into the single source qubit in the form $a|H\rangle + b|V\rangle$. In some embodiments, the single source qubit is the polarization encoded source qubit that is sent from the transmitter system 200 over the optical communication link 302 to the receiver system 100 in FIG. 1.

FIG. 3 is an example system illustrating sending and receiving a quantum state between two systems 100 and 200 according to embodiments. FIG. 3 is a general view of the receiver system 100 in FIG. 1 combined with the transmitter system 200 in FIG. 2.

FIG. 3 shows that the polarization encoded source qubit ($a|H\rangle + b|V\rangle$) is generated by the transmitter system 200 and then transmitted from the transmitter system 200 to the receiver system 100 over the polarization preserved optical fiber 302. The receiver system 100 receives the polarization encoded source qubit ($a|H\rangle + b|V\rangle$) and confirms receipt of the polarization encoded source qubit ($a|H\rangle + b|V\rangle$) via a measurement on the target qubit state from the CNOT operation by the CNOT gate 108A, such that the CNOT gate 108A results in the desired destination qubit ($|0\rangle + b|1\rangle$) having the same quantum state/information as the polarization encoded source qubit ($a|H\rangle + b|V\rangle$).

Although not shown for the sake of conciseness, the transmitter system 200 and the receiver system 100 can both include a time (and phase) tracking system such that the time the polarization encoded source qubit is sent is known and/or agreed upon in advance. This allows the transmitter system 200 to know when to expect the source qubit. In some embodiments, there can be a second communication link between the transmitter system 200 and the receiver system 100 in order to broadcast that the source qubit is being transmitted and to indicate the phase of the source qubit. Also, the receiver system 200 can utilize this second communication link to tell the transmitter system 200 that the destination qubit (having the same quantum state as the polarization encoded source qubit) has successfully arrived.

Figure 5:
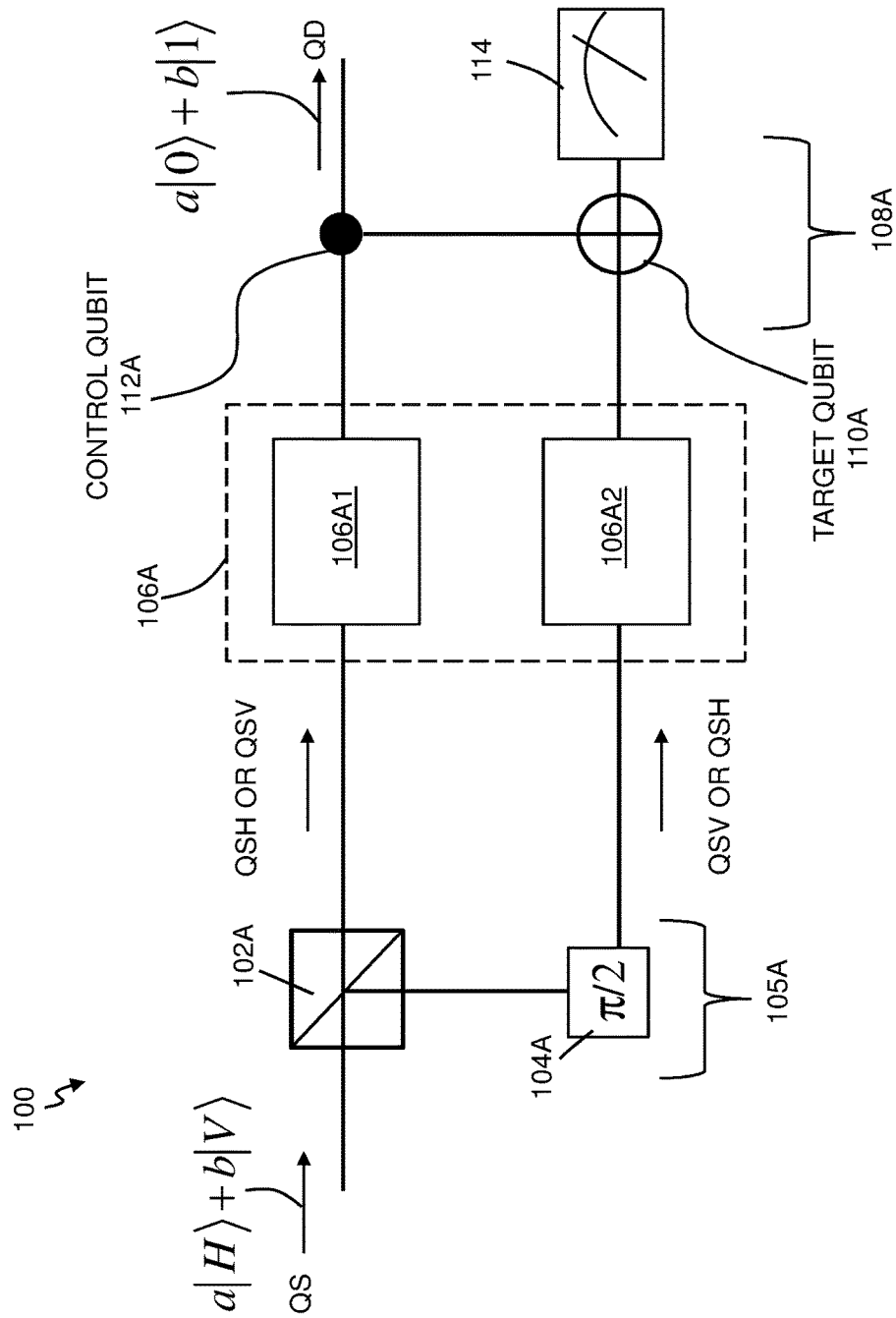
FIG. 5 is a schematic of the receiver system illustrating further details of the converter according to embodiments of the invention.

FIG. 5 is a schematic of the receiver system 100 illustrating further details of the converter according to embodiments. In this example, the converter 106A includes a single-photon optical-to-microwave converter 106A1 configured to process the qubit on the top communication link and a single-photon optical-to-microwave converter 106A2 configured to process the qubit on the bottom communication link. The single-photon optical-to-microwave converters 106A1 and 106A2 are configured to convert an optical photon into a microwave photon that can be processed by the CNOT gate 108A. It should be appreciated that single-photon optical-to-microwave converters would operate in reverse (i.e., as single-photon microwave-to-optical converters) in the transmitter system 200, such that microwave photons are converted to optical photons.

The converters 106A and 106B can be implemented in many ways. For example, the single-photon microwave-to-optical conversion device (or vice versa) can include any suitable device such as electro-optic devices, opto-mechanical devices, piezo-opto-mechanical devices, magneto-optic devices, etc.

Additionally, mathematical details of embodiments of the present invention are provided below. The receiver system 100 (client) prepares the source qubit in the polarization basis and separate into spatial modes which can be represented by $|\Psi\rangle = a|H\rangle + b|V\rangle = a|10\rangle + b|01\rangle$, where $\Psi$ is the quantum state of the qubit. The source qubit travels through the lossy channel (i.e., optical link 302) which can be represented as $\rho_{optical} = \eta(a|10\rangle + b|01\rangle)(h.c.) + (1-\eta)|00\rangle\langle 00|$, where $\rho_{optical}$ describes the density matrix of the optical qubits with loss through the optical link 302, where $\eta$ is a transmission efficiency (a ratio between the transmitted photon amplitude to the initial photon amplitude), where h.c. is the Hermitian conjugate of $(a|10\rangle + b|01\rangle)$). Next, the qubit states are converted from an optical state to a microwave state with $\eta'$ conversion efficiency which can be represented by $\rho_{\mu w} = \eta\eta'(a|10\rangle + b|01\rangle)(h.c.) + (1-\eta\eta')|00\rangle\langle 00|$, where $\rho_{\mu w}$ is the density matrix of the microwave qubits after conversion, where $\eta'$ is the conversion efficiency. Optionally, an IX is performed which is a single-qubit rotation which can be represented by $IX\rho_{\mu w}IX = \eta\eta'(a|11\rangle + b|00\rangle)(h.c.) + (1-\eta\eta')|01\rangle\langle 01|$, where IX is the X rotation (X gate operator) performed on the second qubit (the qubit going into 110A). The X gate rotates the qubit state from 0 to 1 (i.e., single-qubit rotation) and can be performed by applying a pulsed microwave drive. The CNOT is performed which can be represented by $$CNOT \rho_{\mu w} CNOT = \eta\eta'(a|10\rangle + b|00\rangle)(h.c.) + (1-\eta\eta')|01\rangle\langle 01|$$
$$= \eta\eta'(X|\Psi\rangle\langle\Psi|X) \otimes |0\rangle\langle 0| + (1-\eta\eta')|0\rangle\langle 0| \otimes |1\rangle\langle 1|,$$

where X is the X gate operator. Accordingly, measuring a 0 on the second qubit (target qubit) of the CNOT gate indicates successful receipt of the client's state at the first qubit (control qubit).

Figure 6:
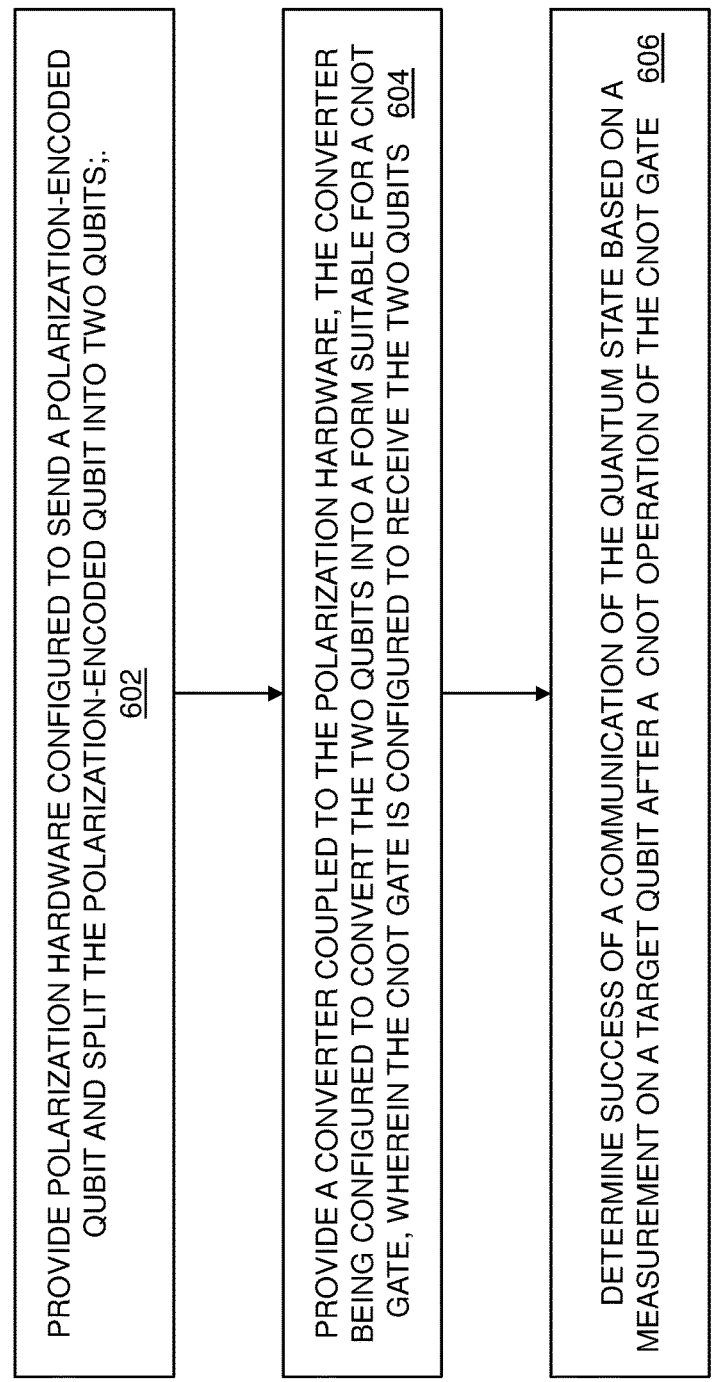
FIG. 6 is a flow chart of a method for communication of a quantum state according to embodiments of the invention.

FIG. 6 is a flow chart 600 of a method for communication of a quantum state according to embodiments. Reference can be made to FIGS. 1-5.

At block 602, the polarization hardware 105A is configured to receive a polarization encoded source qubit $(a|H\rangle + b|V\rangle)$ and split the polarization encoded source qubit (via polarization beam splitter 102A) into two qubits (e.g., horizontal source qubit and vertical source qubit). At block 604, a converter 106A is coupled to the polarization hardware 105A, and the converter 106A is configured to convert the two qubits into a form suitable for a CNOT gate 108A, in which the CNOT gate 108A is configured to receive the two qubits. At block 606, determination of the success of a communication of the quantum state (from the transmitter system 200) is based on a measurement of a target qubit 110A from a CNOT operation of the CNOT gate 108A.

The CNOT gate 108A includes a target qubit 110A and a control qubit 112A. A first qubit of the two qubits is the control qubit 112A and a second qubit of the two qubits is the target qubit 112A. In some embodiments, the receiver 100 can be arranged such that a 0 (zero) on the target qubit 110A indicates success of the communication of the quantum state on the control qubit 112A and the source qubit (QS) is delivered from the sender to the destination qubit (QD). On the other hand, a 1 (one) on the target qubit 110A indicates failure (unsuccessful) of the communication of the quantum state on the control qubit 112A and the source qubit (QS) is not delivered from the sender (e.g., the transmitter system 200) to the destination qubit (QD). The receiver 100 can be arranged such that the 0 on the target qubit 110A confirms receipt of a destination qubit $(a|0\rangle + b|1\rangle)$ on the control qubit 112A, the destination qubit being in a form of $a|0\rangle + b|1\rangle$, and the 1 on the target qubit confirms no receipt of a destination qubit on the control qubit.

In another case, a one (1) on the target qubit 110A can indicate success of the communication of the quantum state on the control qubit 112A, while a zero (0) on the target qubit 110A indicates failure of the communication of the quantum state on the control qubit. In this case, the 1 on the target qubit confirms receipt of a destination qubit on the control qubit, the destination qubit being in a form of $a|0\rangle + b|1\rangle$, and the 0 on the target qubit confirms no receipt of the destination qubit on the control qubit.

The polarization hardware 105A includes a polarizing beam splitter 102A configured to split the polarization encoded qubit into the two qubits such that a first qubit having a horizontal component and a second qubit having a vertical component. The polarization hardware 105A includes a polarization shifter 104A configured to shift either the first qubit having the horizontal component or the second qubit having the vertical component. The converter 106A is configured as an optical-to-microwave converter in one direction and a microwave-to-optical converter in another direction.

Figure 7:
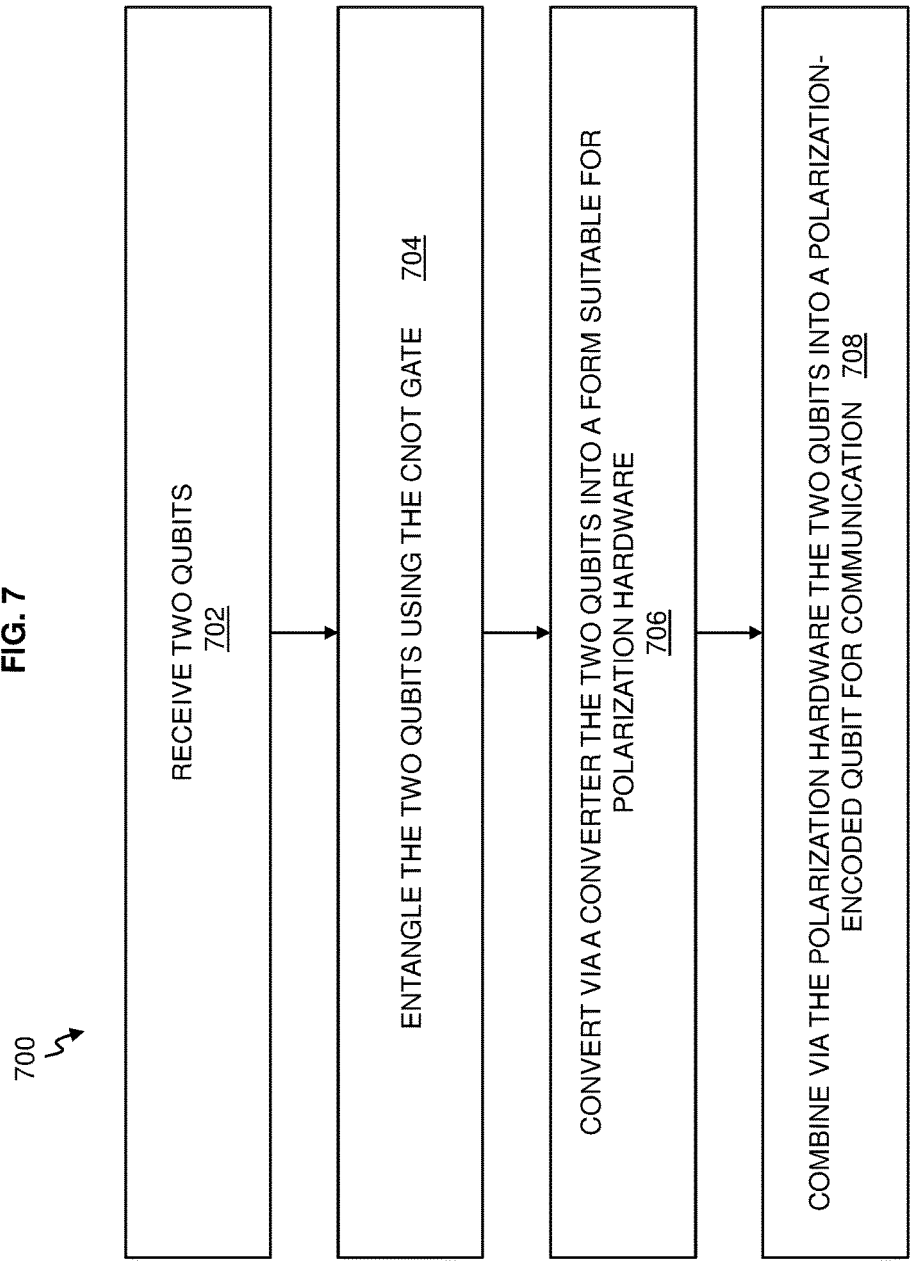
FIG. 7 is a flow chart of a method for communication according to embodiments of the invention.

FIG. 7 is a flow chart 700 of a method for communication according to embodiments. Reference can be made to FIGS. 1-6. At block 702, a CNOT gate 108B is configured to receive two qubits (for example, one in superposition state $|\phi\rangle = a|0\rangle + b|1\rangle$ and the other in a fixed state $|1\rangle$). The CNOT gate 108B is configured to entangle the two qubits at block 704.

At block 706, a converter 106B coupled to the CNOT gate is configured to convert the two qubits into a form suitable for polarization hardware 105B. The two qubits have been entangled to the state $a|01\rangle + b|10\rangle$. At block 708, the polarization hardware 105B is configured to combine the two qubits (or the two modes) into a polarization encoded qubit for communication.

The CNOT gate 108B operates on a target qubit 110B and a control qubit 112B. In some embodiments, the system can be arranged that the first qubit $(|1\rangle)$ of the two qubits is the target qubit and a second qubit $(|\phi\rangle = a|0\rangle + b|1\rangle)$ of the two qubits is the control qubit. The polarization hardware 105B includes a polarizing beam combiner 102B configured to combine the two qubits, thereby forming the polarization encoded qubit $(a|H\rangle + b|V\rangle)$, and the polarization hardware includes a polarization shifter 104B configured to shift either the first qubit or the second qubit. The converter 106B is configured as a microwave-to-optical converter in one direction and an optical-to-microwave converter in another direction.

Figure 8:
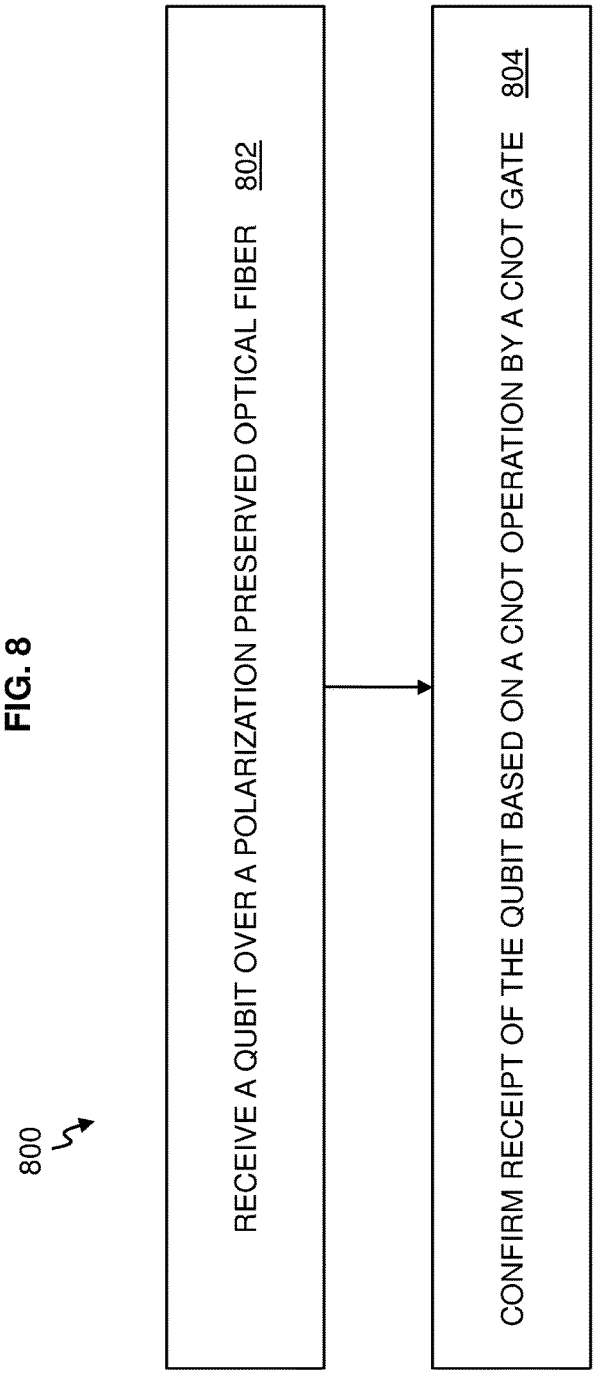
FIG. 8 is a flow chart of a method of confirming communication according to embodiments of the invention.

FIG. 8 is a flow chart 800 of a method of confirming communication according to embodiments. At block 802, the receiver system 100 is configured to receive a qubit $(a|H\rangle + b|V\rangle)$ over a polarization preserved optical fiber 302. At block 804, the receiver system 100 is configured to confirm receipt of the qubit based on a CNOT operation by a CNOT gate 108B.

The qubit is received from a sender (e.g., transmitter system 200) over the polarization preserved optical fiber. In one embodiment, the system can be arranged such that confirming receipt of the qubit is based on receiving a 0 at a target qubit of the CNOT gate measured by the measurement device 114.

Technical effects and benefits include systems and methods for sending and receiving a qubit over a polarization encoded optical link. Technical effects and benefits further include systems/methods configured to transfer a quantum state via a lossy channel with a high yield using a heralded detection of the received qubit state. Technical benefits and effects include systems/methods that enable one to link between optical qubits and microwave qubits and vice versa. Furthermore, the systems/methods are configured to split the input qubit, perform quantum gates (CNOT, single qubit gates), and measure the input (received) qubit state via the heralded detection. Accordingly, post-selecting on the received qubit state from the result of the CNOT gate removes the effect of photon loss in the polarization encoded optical link in which post-selecting is selecting the output of the control qubit to herald the qubit state based on the measurement at the target qubit.

The term "about" and variations thereof are intended to include the degree of error associated with measurement of the particular quantity based upon the equipment available at the time of filing the application. For example, "about" can include a range of ±8% or 5%, or 2% of a given value.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for a communication of a quantum state, the system comprising:
   polarization hardware configured to receive a polarization encoded qubit and split the polarization encoded qubit into two qubits;
   a converter coupled to the polarization hardware, the converter being configured to convert the two qubits into a form suitable for a CNOT gate; and
   the CNOT gate configured to receive the two qubits such that a measurement result of a CNOT operation of the CNOT gate determines success of the communication of the quantum state, wherein the CNOT gate includes a target qubit and a control qubit, and wherein a first qubit of the two qubits is the target qubit and a second qubit if the two qubits is the control qubit wherein:
   the polarization hardware includes a polarizing beam splitter configured to split the polarization encoded qubit into the two qubits such that a first qubit having a horizontal component and a second qubit having a vertical component; and
   the polarization hardware includes a polarization shifter configured to shift either the first qubit having the horizontal component or the second qubit having the vertical component.

2. The system of claim 1, wherein:
   a zero (0) on the target qubit indicates success of the communication of the quantum state on the control qubit;
   a one (1) on the target qubit indicates failure of the communication of the quantum state on the control qubit;
   the 0 on the target qubit confirms receipt of a destination qubit on the control qubit, the destination qubit being in a form of $a|0\rangle + b|1\rangle$; and
   the 1 on the target qubit confirms no receipt of the destination qubit on the control qubit.

3. The system of claim 1, wherein:
   a one (1) on the target qubit indicates success of the communication of the quantum state on the control qubit;
   a zero (0) on the target qubit indicates failure of the communication of the quantum state on the control qubit;
   the 1 on the target qubit confirms receipt of a destination qubit on the control qubit, the destination qubit being in a form of $a|0\rangle + b|1\rangle$; and
   the 0 on the target qubit confirms no receipt of the destination qubit on the control qubit.

4. The system of claim 1, wherein the converter is configured to convert the polarization encoded qubit to a qubit on which the CNOT operation can be performed.

5. A method for a communication of a quantum state, the method comprising:
   providing polarization hardware configured to receive a polarization encoded qubit and split the polarization encoded qubit into two qubits;
   providing a converter coupled to the polarization hardware, the converter being configured to convert the two qubits into a form suitable for a CNOT gate, wherein the CNOT gate is configured to receive the two qubits; and
   determining success of the communication of the quantum state based on a measurement result of the target qubit from a CNOT operation of the CNOT gate, wherein the CNOT gate includes a target qubit and a control qubit, and wherein a first qubit of the two qubits is the target qubit and a second qubit of the two qubits is the control qubit wherein:
   the polarization hardware includes a polarizing beam splitter configured to split the polarization encoded qubit into the two qubits such that a first qubit having a horizontal component and a second qubit having a vertical component; and the polarization hardware includes a polarization shifter configured to shift either the first qubit having the horizontal component or the second qubit having the vertical component.

6. The method of claim 5, wherein:

a zero (0) on the target qubit indicates success of the communication of the quantum state on the control qubit;

a one (1) on the target qubit indicates failure of the communication of the quantum state on the control qubit;

the 0 on the target qubit confirms receipt of a destination qubit on the control qubit, the destination qubit being in a form of $a|0\rangle+b|1\rangle$; and the 1 on the target qubit confirms no receipt of the destination qubit on the control qubit.

7. The method of claim 5, wherein:

a one (1) on the target qubit indicates success of the communication of the quantum state on the control qubit;

a zero (0) on the target qubit indicates failure of the communication of the quantum state on the control qubit;

the 1 on the target qubit confirms receipt of a destination qubit on the control qubit, the destination qubit being in a form of $a|0\rangle+b|1\rangle$; and the 0 on the target qubit confirms no receipt of the destination qubit on the control qubit.

8. The method of claim 5, wherein the converter is configured as an optical-to-microwave converter in one direction and a microwave-to-optical converter in another direction.

9. A confirming communication method comprising:

receiving, using polarization hardware, an encoded qubit over a polarization preserved optical fiber, the polarization hardware configured to receive and split the encoded qubit into two qubits; and confirming, using a CNOT gate, receipt of the encoded qubit based on a measurement from a CNOT operation, wherein the CNOT gate includes a target qubit and a control qubit, and wherein a first qubit of the two qubits is the target qubit and a second qubit of the two qubits is the control qubit wherein:

the polarization hardware includes a polarizing beam splitter configured to split the polarization encoded qubit into the two qubits such that a first qubit having a horizontal component and a second qubit having a vertical component; and the polarization hardware includes a polarization shifter configured to shift either the first qubit having the horizontal component or the second qubit having the vertical component.

10. The method of claim 9, wherein the encoded qubit is received from a transmitter system over the polarization preserved optical fiber.

11. The method of claim 9, wherein confirming receipt of the encoded qubit is based on a measurement at a target qubit of the CNOT gate.

* * * * *